United States Patent
Levy

(10) Patent No.: US 7,499,215 B2
(45) Date of Patent: Mar. 3, 2009

(54) VIDEO SCREEN PANEL APPARATUS AND SYSTEM

(75) Inventor: Paul S. Levy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 11/323,201

(22) Filed: Dec. 30, 2005

(65) Prior Publication Data

US 2007/0153138 A1    Jul. 5, 2007

(51) Int. Cl.
G03B 21/56    (2006.01)

(52) U.S. Cl. .................. 359/460; 359/443; 348/839; 348/840

(58) Field of Classification Search ............ 359/443, 359/449, 460; 348/839, 840, 14.07; 349/56, 349/73, 74, 143; 345/1.1, 1.3, 4, 5, 30, 40, 345/38; D06/332
See application file for complete search history.

(56) References Cited

U.S. PATENT DOCUMENTS

| | | | |
|---|---|---|---|
| 4,473,355 A | 9/1984 | Pongratz | |
| 5,400,178 A * | 3/1995 | Yamada et al. | 359/449 |
| 5,541,769 A * | 7/1996 | Ansley et al. | 359/451 |
| 6,000,668 A * | 12/1999 | Mannick | 248/201 |
| 6,081,375 A | 6/2000 | Furuya et al. | |
| 6,296,214 B1 | 10/2001 | Mannick | |
| 2002/0048438 A1* | 4/2002 | Veligdan | 385/120 |
| 2003/0179449 A1* | 9/2003 | Teramoto et al. | 359/443 |
| 2007/0001927 A1* | 1/2007 | Ricks et al. | 345/1.1 |

FOREIGN PATENT DOCUMENTS

| | | |
|---|---|---|
| EP | 0627638 A1 | 12/1994 |
| EP | 0714083 A2 | 5/1996 |
| WO | 2007078890 A1 | 7/2007 |

OTHER PUBLICATIONS

International Search Report and Written Opinion for Application No. PCT/US2006/048054, (May 21, 2007), 12 pgs.

* cited by examiner

Primary Examiner—W. B. Perkey
Assistant Examiner—Warren K Fenwick
(74) Attorney, Agent, or Firm—Kacvinsky LLC

(57) ABSTRACT

A first panel includes an optically transmissive body having a front side and a rear side. The body has a width, a height, and a depth. The depth is substantially less than either of the width or the height. The body includes a first edge on a first side defining a first tongue protruding outwardly from the first edge. The body includes a second edge on a second side defining a first groove recessed within the second edge. The first tongue is adapted to couple to a corresponding groove and the first groove is adapted to couple to a corresponding tongue. A first optical film is coupled to the front side of the body.

19 Claims, 4 Drawing Sheets

VIDEO SCREEN PANEL APPARATUS AND SYSTEM

BACKGROUND

Large video screens are generally formed using separate individual panels mounted in individual frames and then assembled as a single unit. In these types of large video screens, however, the seam or outline of the individual screen frames is visible and thus creates discontinuities in the displayed image. Single piece video screens may alleviate this problem, but are generally too large and may be cumbersome to transport, install, and de-install.

Thus, there is a need for video screens that are easy to assemble, transport, install, and de-install. In addition, there is a need for large video screens with a seamless display area, free from seams of adjacent screens. There is a need to render the seam invisible in the optical spectrum to provide a seamless screen.

DETAILED DESCRIPTION

Figure 1:
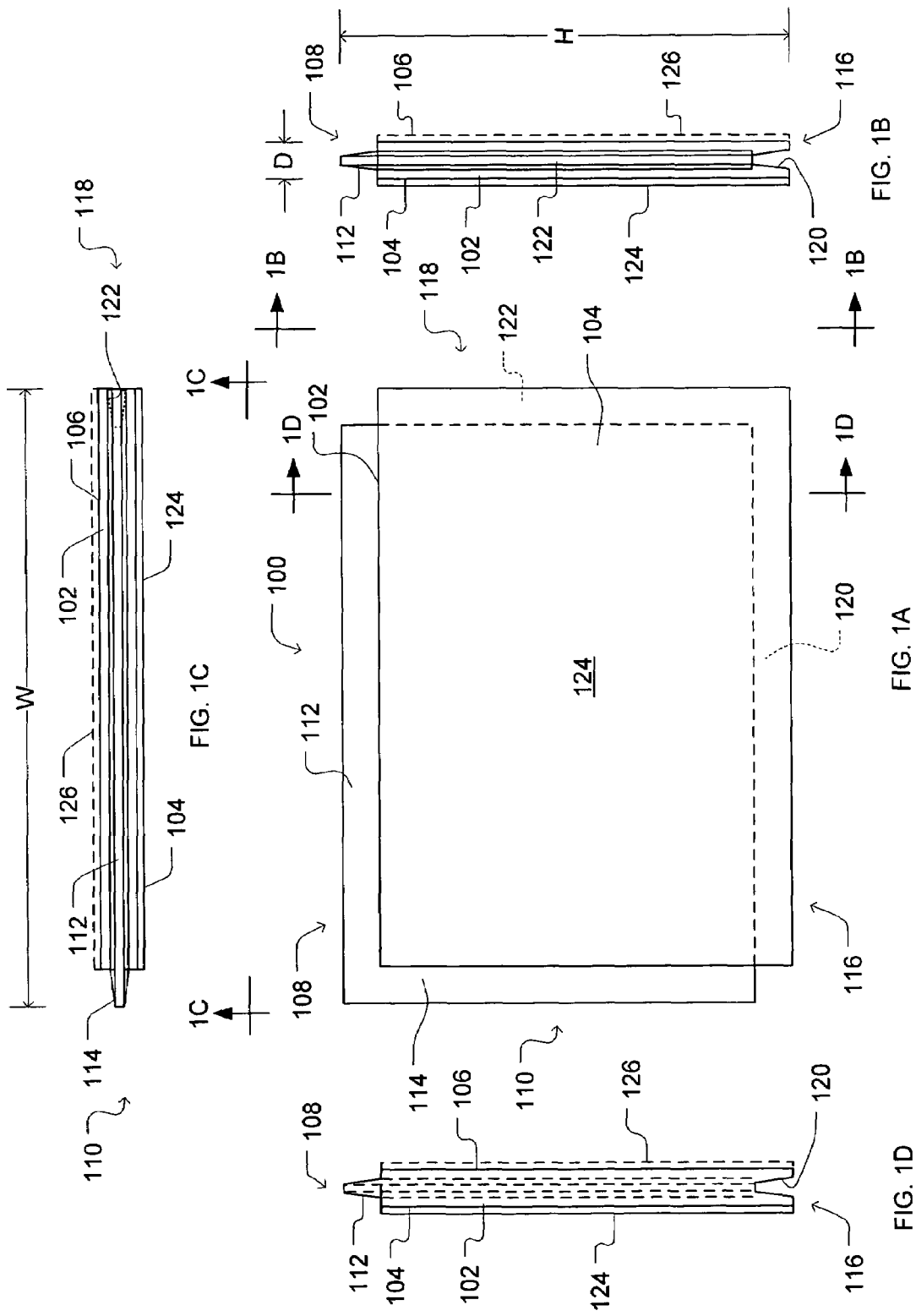
FIG. 1A illustrates a front view of one embodiment of a screen panel.
FIG. 1B illustrates a side view of one embodiment of the screen panel shown in FIG. 1A taken along 1B-1B.
FIG. 1C illustrates a top view of one embodiment of the screen panel shown in FIG. 1A taken along 1C-1C.
FIG. 1D illustrates a cross-sectional view of one embodiment of the screen panel shown in FIG. 1A taken along 1D-1D.

FIG. 1A illustrates a front view of one embodiment of a screen panel 100. FIG. 1B illustrates a side view of one embodiment of the screen panel 100 shown in FIG. 1A taken along 1B-1B. FIG. 1C illustrates a top view of one embodiment of the screen panel 100 shown in FIG. 1A taken along 1C-1C. FIG. 1D illustrates a cross-sectional view of one embodiment of the screen panel 100 shown in FIG. 1A taken along 1D-1D. The screen panels 100 may be arranged to implement a large screen, video projection wall, rear projection video screen, front projection video screen, video wall, and video screen. The embodiments are not limited in this context.

Referring now to FIGS. 1A-D, the screen panel 100 comprises a body 102 having a front side 104 and a rear side 106. The panel 100 has a width W, a height H, and a depth D. The width W has a longitudinal dimension, the height H has an upwardly extending dimension, and the depth D has a thickness dimension that is substantially less than either of the width W or the height H dimension. The body 102 includes a first side 108 defining a first tongue 112. As used herein, a tongue refers to a projecting piece of the body 102 that is suitable to fit into a corresponding groove in another body. The tongue projection is generally thinner that the main thickness D of the body 102. The first tongue 112 protrudes outwardly from the respective first side 108 of the body 102 along the height H dimension. The first tongue 112 may extend longitudinally along the width W dimension. In one embodiment a second tongue 114 may be provided on a second side 110 of the panel 100 and may protrude outwardly from the respective second side 110 along the width W dimension and may extend longitudinally along the height H dimension although the embodiments are not limited in this context. The body 102 includes a third side 116 defining a first groove 120. The first groove 120 is recessed within the third side 116 of the body 102 and may extend longitudinally along the width W dimension. In one embodiment, a second groove 122 may be provided on a fourth side 118 of the body 102 and the second groove 122 may be recessed within the fourth side 118 and may extend longitudinally along the height H dimension, although the embodiments are not limited in this context.

The first and second tongues 112, 114 may be formed to be slidingly received in corresponding grooves, similar to the first and second grooves 120, 122, formed on panels or frame members located adjacent to the panel 100. Likewise, the first and second grooves 120, 122 may be formed to slidingly receive corresponding tongues, similar to the first and second tongues 112, 114, formed on a panel or frame member located adjacent to the panel 100. Accordingly, the first and second tongues 112, 114 and the first and second grooves 120, 122 formed on the panel 100 may be adapted to couple to corresponding grooves and tongues formed on a second panel or a frame member located adjacent to the panel 100 to couple the panel 100 to a corresponding adjacent panel or to couple the panel 100 to an adjacent frame member.

In one embodiment, the body 102 may be formed of an optically transmissive material. For example, in one embodiment, the body 102 may be formed of a clear transparent material. On example of such material is a transparent thermoplastic synthetic resin formed by casting or molding, which has the clarity of glass. A specific thermoplastic synthetic resin material having these properties is polymethyl methacrylate (PMMA) or polymethyl-2-methylpropanoate, which is the synthetic polymer of methyl methacrylate. This thermoplastic and transparent plastic is sold by various manufacturers under the trade names of PLEXIGLAS, PERSPEX, ACRYLITE, ACRYLPLAST, and LUCITE and is commonly called ACRYLIC GLASS or simply ACRYLIC. In other embodiments, the body 102 may be formed of other clear, transparent synthetic resins such as polycarbonate, for example, as well as clear transparent glass. The front and rear sides 104, 106 of the body 102 may be processed to form a surface having optical characteristics required to disperse an image projected thereon. The optical characteristics may be formed by machining, chemical etching, abrading, or otherwise formed on the front and rear side 104, 106 surfaces of the body 102

In one embodiment, the first and second tongues 112, 114 may be formed in any suitable shape. The first and second grooves 120, 122 may be formed in any corresponding suitable shape to slidingly receive the first and second tongues 112 formed on adjacent structures such as panels or frame members. As shown in FIGS. 1A-D, the first and second tongues 112, 114 may be formed with a tapered geometry with a flat top to be slidingly received in correspondingly shaped first and second grooves 120, 122 formed on adjacent structures such as panels or frame members. The first and second tongues 112, 114 and the first and second grooves 120, 122, however, may be formed in any suitable geometry including tapered sides and a round top, straight sides and a flat or rounded top, dovetail, or any other configuration. The embodiments are not limited in this context.

In one embodiment, a satin finish may be formed on a surface of the first and second tongues 112, 114 and a surface of the first and second grooves 120, 122. A satin finish may comprise a matte finish with a texture formed on a shiny or glossy surface, such as a cast or molded thermoplastic synthetic resin or glass, to alter its shiny or glossy surface finish and render its surface suitable to receive and hold material. The satin finish may be formed on the surfaces of the first and second tongues 112, 114 and/or the first and second grooves 120, 122. The satin finish may be formed mechanically by scratching, sandblasting, brushing, abrading, or chemically by etching the surfaces of the first and second tongues 112, 114 and/or the first and second grooves 120, 122. The satin finish provides a rough surface to receive and hold material such as vacuum grease (see FIGS. 2A, 2B) disposed thereon. Vacuum grease is a low volatility lubricant that may be used for applications in low pressure environments. Lubricants with higher volatility normally evaporate, fail to provide lubrication, and make lowering the pressure below their vapor pressure difficult.

Multiple panels 100 may be assembled using known vacuum forming techniques. The satin finish on the mating tongues and grooves holds the vacuum grease to form a seal. In one embodiment, the vacuum grease has optical characteristics that match the optical characteristics of the material that the body 102 is formed of. For example, in one embodiment, the vacuum grease may be selected with optical characteristics similar to those of clear, transparent thermoplastic synthetic resins or glass or any other suitable material used to form the body 102. The optically matched vacuum grease does not add color to the images displayed on the panel 100 and renders the seams formed by joining multiple panels 102 invisible. Multiple panels 100 may be assembled in an array by stacking one on top of another and side-to-side. The adjoining tongues 112, 144 and the respective grooves 120, 122 in each of the panels 100 may be treated with the vacuum grease to render the joints or seams between the tongues 112, 114 and the grooves 120, 122 invisible in the optical spectrum and thus form a seamless screen. To an observer, the assembled array of panels 100 optically appears as a single piece seamless screen with no seams showing between the adjacent panels 100.

In one embodiment, a first optical film 124 may be disposed adjacent to the body 102. The first optical film 124 may be coupled to the front side 104 of the body 102. In another embodiment, a second optical film 126 may be disposed adjacent to the rear side 106 of the body 102. The first and/or second optical films 124, 126 may be formed with suitable optical characteristics rather than forming these optical characteristics directly on the front and rear side 104, 106 surfaces of the body 102 as previously discussed. In one embodiment, the first optical film 124 may be formed of an optically translucent material to reflect light so as to disperse an image that is projected thereon from the front side 104 of the panel 100. In one embodiment, the second optical film 126 may be formed of an optically transparent material to transmit light projected from the rear side 106 of the body 102 to transmit light through the body 102. The first and second optical films 124, 126 may be coupled to the body 102 of the panel 100 in any suitable manner. For example, as discussed below with reference to FIGS. 2A-C and FIG. 3, the first and second optical films 124, 126 may be coupled to the body 102 of the panel 100 by attaching a portion of one end of the first and second optical films 124, 126 to frame members and stretching the optical films 124, 126 over one or multiple panels 100 forming a screen, for example. In one embodiment, the first and second optical films 124, 126 may be coupled to the body 102 using a vacuum forming technique wherein a vacuum is applied between the first optical film 124 and the body 102 and the second optical film 126 and the body 102 to form a three-layer composite structure comprising the first and second optical films 124, 126 and the body 102 disposed between them. The embodiments are not limited in this context.

Figure 2:
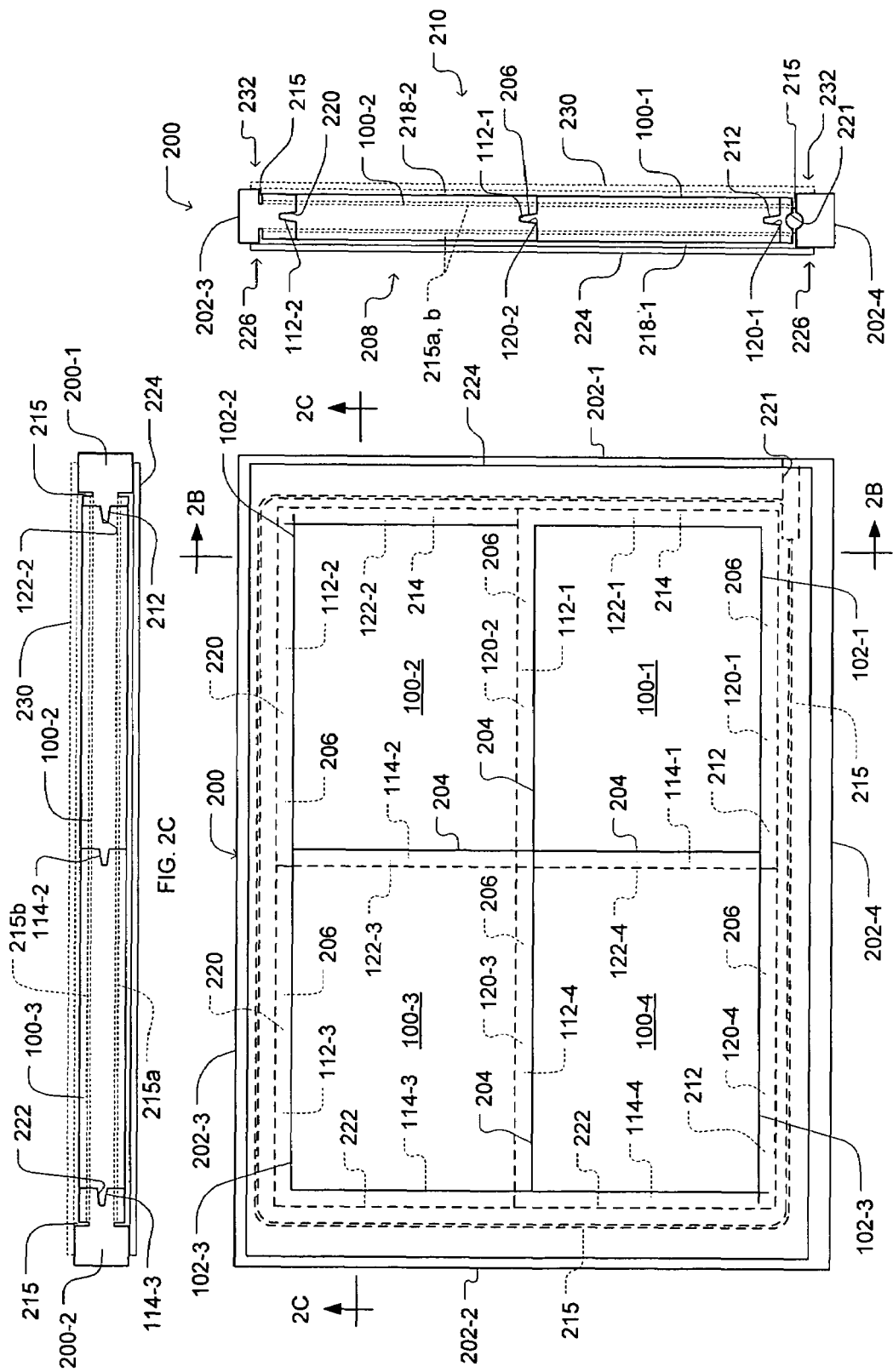
FIG. 2A illustrates a front view of one embodiment of a four panel screen assembly.
FIG. 2B illustrates a side view of one embodiment of the four panel screen assembly shown in FIG. 2A taken along 2B-2B.
FIG. 2C illustrates a top view of one embodiment of the four panel screen assembly shown in FIG. 2A taken along 2C-2C.

FIG. 2A illustrates a front view of one embodiment of a panel screen assembly 200. FIG. 2B illustrates a side view of one embodiment of the panel screen assembly 200 shown in FIG. 2A taken along 2B-2B. FIG. 2C illustrates a top view of one embodiment of the panel screen assembly 200 shown in FIG. 2A taken along 2C-2C. With reference to FIGS. 2A-C, one embodiment of the panel screen assembly may comprise two or more panels 100-1, 100-2, 100-3, 100-n (where n may be any number of panels) assembled as an integral unit and attached to a frame 202. The panels 100-1-n may be assembled by coupling first and second tongues of a panel or a frame member to corresponding first and second grooves formed in the frame 202 or adjacent panels 100-2-n. In one embodiment, the panel screen assembly 200 forms a video screen comprised of the individual panels 100-1-n mounted in the frame 202. Up to n panels may be assembled to create large screens that are easy to transport, assemble, and disassemble rather than a single element screen that may be large and cumbersome to transport. Front and rear optical films 224, 230 may be coupled to the body 102-1-n portions of each of the panels 100-1-n using vacuum forming techniques. Vacuum grease 206 that is optically matched to the body 102-1-n is provided between the joints 204 formed by tongues and grooves to create a seamless screen formed of the assembled array of the panels 100-1-n. Thus, although the panel screen assembly 200 is formed of the individual modular panels 100-1-n, to an observer the panel screen assembly 200 appears as a seamless single screen.

In the illustrated embodiment, the panel screen assembly 200 comprises an array of four panels 100-1-4 mounted in the frame 202. The panels 100-1-4 comprises respective bodies 102-1-4. The frame 202 may comprise four frame members 202-1, 202-2, 202-3, 202-4 interconnected to form either a square or rectangular (shown) frame structure. For example, right and left frame members 202-1-2 are substantially parallel and vertically oriented and top and bottom frame members 202-3-4 are substantially parallel, horizontally oriented, and substantially orthogonal to the right and left frame members 202-1-2. Each panel 100-1-4 is adapted to be coupled to an adjacent frame member 202-1-4 and/or to an adjacent panel 100-1-4. Specific details of one embodiment of the panel 100 are described above with reference to FIGS. 1A-D.

The top horizontal frame member 202-3 comprises a first groove 220 to slidingly receive the first tongues 112-2, 112-3 of the second and third panels 100-2, 100-3, respectively. The bottom horizontal frame member 202-4 comprises a first tongue 212 to slidingly receive the first grooves 120-1, 120-4 of the first and fourth panels 100-1, 100-4, respectively. The right vertical frame member 202-1 comprises a second tongue 214 to slidingly receive the second grooves 122-1, 122-2 of the first and second panels 100-1, 100-2, respectively. The left vertical frame member 202-2 comprises a second groove 222 to slidingly receive the second tongues 114-3, 114-4 of the third and fourth panels 100-3, 100-4, respectively.

The first tongue 112-1 of the first panel 100-1 is adapted to couple to a corresponding first groove 120-2 of the second panel 100-2. The second tongue 114-1 of the first panel 100-1 is adapted to couple to the second groove 122-4 of the fourth panel 100-4. The first groove 120-1 of the first panel 100-1 is adapted to couple to the first tongue 212 of the bottom horizontal frame member 202-4. The second groove 122-1 of the first panel 100-1 is adapted to couple to the second tongue 214 of the right vertical frame member 202-1.

The first tongue 112-2 of the second panel 100-2 is adapted to couple to the corresponding groove 220 of the top horizontal frame member 202-3. The second tongue 114-2 of the second panel 100-2 is adapted to couple to the second groove 122-3 of the third panel 100-3. The first groove 120-2 of the second panel 100-2 is adapted to couple to the first tongue 112-1 of the first panel 100-1. The second groove 122-2 of the second panel 100-2 is adapted to couple to the second tongue 214 of the right vertical frame member 202-1.

The first tongue 112-3 of the third panel 100-3 is adapted to couple to the corresponding groove 220 of the horizontal frame member 202-3. The second tongue 114-3 of the third panel 100-3 is adapted to couple to the second groove 222 of the left vertical frame member 202-2. The first groove 120-3 of the third panel 100-3 is adapted to couple to the first tongue 112-4 of the fourth panel 100-4. The second groove 122-3 of the third panel 100-3 is adapted to couple to the second tongue 114-2 of the second panel 100-2.

The first tongue 112-4 of the fourth panel 100-4 is adapted to couple to the corresponding first groove 120-3 of the third panel 100-3. The second tongue 114-4 of the fourth panel 100-4 is adapted to couple to the second groove 222 of the left vertical frame member 202-2. The first groove 120-4 of the third panel 100-4 is adapted to couple to the first tongue 212 of the bottom horizontal frame member 202-4. The second groove 122-4 of the fourth panel 100-4 is adapted to couple to the second tongue 114-1 of the first panel 100-1.

The optically matched vacuum grease 206 may be provided between the mating surfaces of the panels 100-1-4 and the frame members 202-1-4. The seams 204 are formed when the panels 100-1-4 are assembled in the frame 202.

A first optical film 224 defines a perimeter 226 to attach to the frame members 202-1-4. The first optical film 224 is disposed adjacent to and coupled to the front side 208 of the panel screen assembly 200. In one embodiment, a second optical film 230 defines a perimeter 232 to attach to the respective frame members 202-1-4. The second optical film 230 may be disposed adjacent to and coupled to the rear side 210 of the panel screen assembly 200 along its perimeter edge 232. A gap 218-1 is formed between the first optical film 224 and the front side 208 of the panel screen assembly 200. A gap 218-2 is formed between the second optical film 230 and the rear side 210 of the panel screen assembly 200. In one embodiment, the first and second films 224, 230 may be coupled to the panels 100-1-4 of the panel screen assembly 200 by applying a vacuum to a vacuum port 221 formed in the frame 202. When the vacuum is applied to the vacuum port 221, vacuum channels 215a, b formed within the frame 202 and fluidly coupled to the front and/or rear sides 208, 210 of the panel screen assembly 200 evacuate the gaps 218-1, 218-2 to couple the first and second optical films 224, 230 to the respective front and rear sides 208, 210 of the assembled panels 100-1-4. This may be further illustrated with reference to FIG. 3 below.

Figure 3:
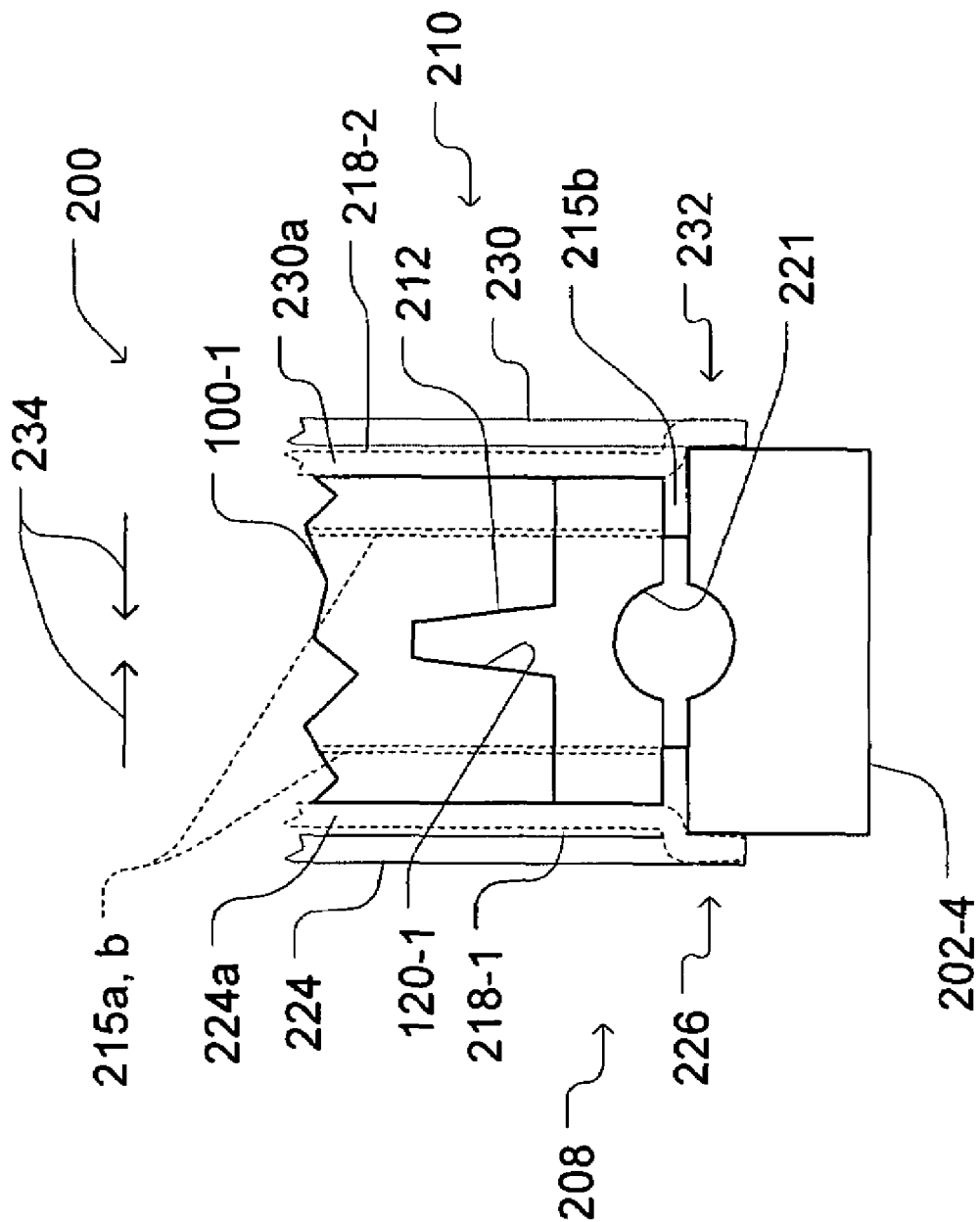
FIG. 3 illustrates a detail view of a side view of a bottom portion of one embodiment of the screen assembly shown in FIGS. 2A, 2B.

FIG. 3 illustrates a detail view of a side view of a bottom portion of one embodiment of the panel screen assembly 200 shown in FIGS. 2A, 2B. The vacuum channel 215a may be formed within the frame members 202-1-4 and may be fluidly coupled to the gap 218-1 and the vacuum port 221. In one embodiment, the vacuum channel 215b may be fluidly coupled to the gap 218-2 and the vacuum port 221. In one embodiment, the vacuum channels 215a, b may be formed in any suitable manner as single or multiple channels. In one embodiment, the vacuum channels 215a, b evacuate either or both the gaps 218-1, 218-2 between the panels 100-1-4 and the respective first and second optical films 224, 230. The vacuum port 221 may be formed in the frame 202 and is fluidly coupled to the vacuum channels 215a, b. Before a vacuum is applied to the vacuum port 221, the first and second optical films 224, 230 are located in a first position where the air gaps 218-1, 218-2 are present. When a vacuum is applied to the vacuum port 221, the vacuum channel 215a, b and the first and second gaps 218-1, 218-2 are evacuated, and the first and second optical films 224, 230 are sucked-in towards the respective front 208 and rear 210 sides of the panels 100-1-4 in direction 234 and the first and second optical films 224a, 230a (shown in dashed lines) are vacuum coupled to the panels 100-1-4. The vacuum port 221 is then sealed and the first and second optical films 224a, 230a remain coupled to the panels 100-1-4 as shown in dashed line at position. The vacuum channels 215a, b may be formed in each of the frame member 202-1-4.

The perimeters 226, 232 of the first and second optical films 224, 230 may be attached and sealed to the frame members 202-1-4 such that they overlap the vacuum channel 215 so that when a vacuum is applied to the vacuum port 221 the gaps 218-1, 218-2 are evacuated and the first and second optical films 224a, 230a are coupled to the respective front and rear sides 208, 210 of the panel screen assembly 200.

Figure 4:
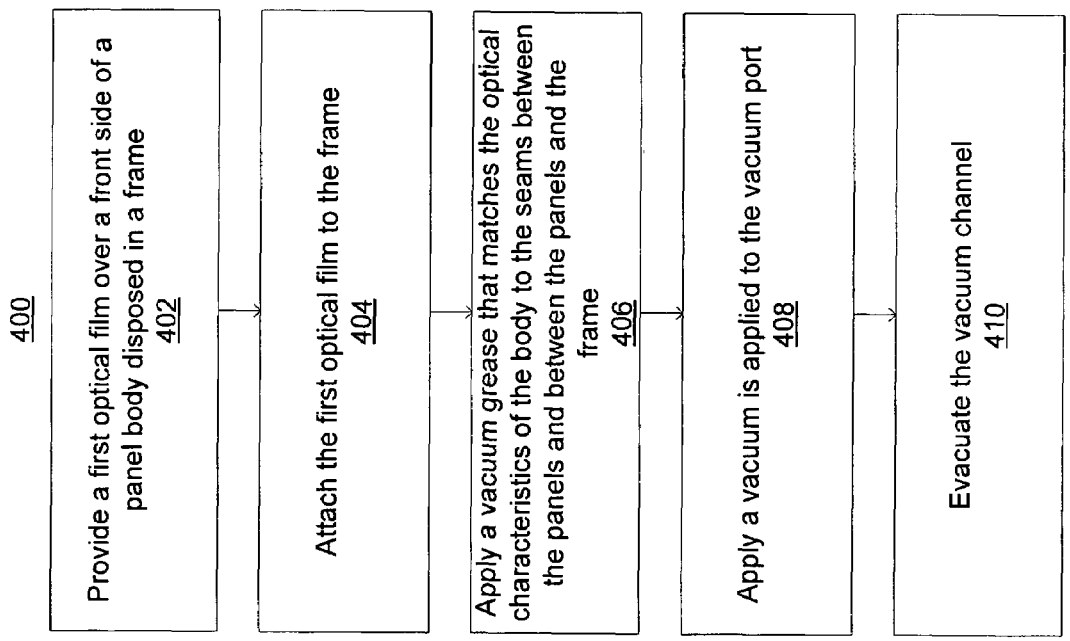
FIG. 4 illustrates one embodiment of a process for making one embodiment of a screen.

FIG. 4 illustrates one embodiment of a flow diagram 400 to form a panel screen assembly 200. Accordingly, a first optical film 224 is provided (402) over a front side 208 of a panel body 102 disposed in a frame 202. The first optical film 112 comprises a perimeter 226 which is attached (404) to the frame 202. The frame 202 includes a vacuum channel 215 and a vacuum port 221 fluidly coupled to the vacuum channel 215. The first optical film 224 is attached to the frame 202 such that a first gap 218-1 is formed between the first optical film 224 and the front side 208 of the panel screen assembly 200. The vacuum channel 215 is not obstructed by the optical film 224. The first gap 218-1 is fluidly coupled to the vacuum port 221 in order to evacuate the first gap 218-1. A vacuum grease 206 that matches the optical characteristics of the body 102 (or panel 100) is applied (406) to the seams 204 between the panels 100 and between the panels and the frame 202. A vacuum is applied (408) to the vacuum port 221 and the vacuum channel 215 is evacuated (410). The first optical film 224 collapses to the body 102 as the first gap 218-1 is evacuated to couple the first optical film 224 to the front side 208 of the panel screen assembly 200.

A second optical film 230 may be provided over a rear side 210 of the panel screen assembly 200 such that a second gap 218-2 is formed between the second optical film 230 and the rear side 210 of the panel screen assembly 200. The second gap 118-2 is evacuated as the vacuum channel 214 is evacuated to couple the second optical film 230 to the rear side 210 of the panel screen assembly 200. The optically matched vacuum grease 206 may be applied between the panels 100-1-4 and the frame 202-1-4 members. Multiple panels 100-1-n may be assembled and coupled together by the respective tongues and grooves. The optically matched vacuum grease 206 may be applied between the tongues 112-1-4, 114-1-4 and the grooves 120-1-4, 122-1-4 portions of the panels 100-1-4 and/or the corresponding grooves 220, 222 and tongues 212, 214 of the frame members 202-1-4.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a first panel comprising an optically transmissive body having a front side and a rear side, said body having a width, a height, and a depth, said depth is substantially less than either of said width or said height, said body comprising a first edge on a first side defining a first tongue protruding outwardly from said first edge, said body comprising a second edge on a second side defining a first groove recessed within said second edge, wherein said first tongue is adapted to couple to a corresponding groove and said first groove is adapted to couple to a corresponding tongue, said first tongue comprises first and second tapered sides and a flat top side and said first tongue extends longitudinally along said length of said first panel; and
a first optical film coupled to said front side of said body.

2. The apparatus of claim 1, wherein said first groove comprises third and fourth tapered sides corresponding to said first and second tapered sides of said first tongue extend longitudinally along said width dimension and define surfaces of said first groove.

3. The apparatus of claim 2, wherein said tongue first and said first groove comprises a satin finish.

4. The apparatus of claim 3, further comprising vacuum grease optically matched to said optically transmissive body.

5. The apparatus of claim 1, wherein said body is formed of a clear, transparent thermoplastic synthetic resin.

6. The apparatus of claim 1, wherein said body is formed of clear transparent glass.

7. The apparatus of claim 1, wherein said first optical film is optically translucent.

8. The apparatus of claim 1, further comprising a second optical film coupled to said rear side of said body.

9. The apparatus of claim 8, wherein said second optical film is optically transparent.

10. The apparatus of claim 1, wherein said body further comprises a third edge on a third side defining a second tongue protruding outwardly from said third edge, said body comprising a fourth edge on a fourth side defining a second groove recessed within said fourth edge, wherein said second tongue is adapted to couple to a corresponding groove and said second groove is adapted to couple to a corresponding tongue.

11. The apparatus of claim 1, wherein said first tongue and said first groove are adapted to couple to either a corresponding panel or frame member.

12. A system, comprising:
a first panel adapted to be coupled to a frame member on one side and to a second panel on the other side, said first panel comprising an optically transmissive body having a front side and a rear side, said body having a width, a height, and a depth, said depth is substantially less than either of said width or said height, said body comprising a first edge on a first side defining a first tongue protruding outwardly from said first edge, said body comprising a second edge on a second side defining a first groove recessed within said second edge, wherein said first tongue is adapted to couple to a corresponding groove and said first groove is adapted to couple to a corresponding tongue; and a first optical film coupled to said front side of said body;
said frame having a first member adapted with a second groove to receive said first tongue;
a vacuum channel formed in said frame;
a vacuum port fluidly coupled to said vacuum channel; and
vacuum grease optically matched to said optically transmissive body provided between said first tongue and said second groove.

13. The system of claim 12, further comprising a first optical film adapted to said front side of said body.

14. The system of claim 12, wherein said vacuum port is adapted to seal after said vacuum channel is evacuated to couple said optical film to said body.

15. The system of claim 12, further comprising a second optical film coupled to said rear side of said body.

16. A method of forming a screen, comprising:
providing a first optical film over a front side of a panel disposed within a frame, said frame comprising a vacuum channel and a vacuum port fluidly coupled to said vacuum channel;
attaching said first optical film to said frame;
applying a vacuum grease to seams formed between adjacent panels;
applying a vacuum to said vacuum channel; and
evacuating said vacuum channel to couple said first optical film to said front side of said panel.

17. The method of claim 16, further comprising:
providing a second optical film over a rear side of said panel disposed within a said, said frame comprising a vacuum channel fluidly coupled to said rear side of said panel and said vacuum channel fluidly coupled to said vacuum port;
attaching said second optical film to said frame; and
evacuating said vacuum channel to couple said second optical film to said rear side of said panel.

18. The method of claim 16, further comprising applying optical grease between said panel and said frame members.

19. The method of claim 16, further comprising:
providing said first optical film over a front side of multiple panels disposed within a frame, said frame comprising a vacuum channel and a vacuum port fluidly coupled to said vacuum channel;
applying a vacuum grease to seams formed between adjacent panels of said multiple panels;
applying a vacuum to said vacuum channel; and
evacuating said vacuum channel to couple said first optical film to said front side of said multiple panels.

* * * * *